May 16, 1961

C. W. RANSON 2,984,304

HELICOPTER LIFTING ROTOR HAVING A PROPULSION
UNIT AT THE BLADE TIP

Filed Nov. 24, 1954

INVENTOR.

Charles W. Ranson

United States Patent Office 2,984,304
Patented May 16, 1961

2,984,304

HELICOPTER LIFTING ROTOR HAVING A PROPULSION UNIT AT THE BLADE TIP

Charles W. Ranson, 7906 Agnew Ave., Los Angeles, Calif.

Filed Nov. 24, 1954, Ser. No. 471,055

5 Claims. (Cl. 170—135.4)

The present invention relates to a jet propulsion engine wherein quantities of atmospheric air are heated and accelerated to provide useful thrust. The engine is particularly suitable for installation at rotor blade tips of helicopters.

An object of the present invention is to provide for increased maximum thrust by inducing greater airflow through a ram-pulse jet engine.

A second object is to provide improved fuel consumption by handling a larger mass of air flow and accelerating the air flow a smaller amount for a given thrust.

A third object is to provide an improved flame holder with improved mixing of fuel and air and with reduced pressure losses and higher thermal efficiency.

A fourth object is to provide a ram jet engine having self-starting characteristics and operable at zero air speed.

Other objects are to provide a high frequency constant volume combustion cycle engine having minimum pressure losses from valve throttling and tail pipe exit flow reversals and having provision for sound control by varying frequency and amplitude of explosions.

A number of other objects and advantages will become apparent as the description proceeds.

One form of the present invention is illustrated in the accompanying drawings wherein similar numerals refer to similar parts throughout the several views.

The prior art has provided the well known conventional ram jet engine having a fixed gutter-type flame holder and pulse jet engine having a grid of flapper type spring-leaf valves. An additional advance in the art has also provided a pulse jet engine in which the flapper type valves have been replaced by a rotary butterfly valve located in a straight inlet duct and driven by an electric motor.

The ram jet engine of the prior art will not operate at low flight speeds and cannot be started except in flight. Also the conventional ram jet engine is subject to flame blow out and to limited developed thrust dependent on ram pressures. The present invention overcomes these deficiencies and additionally improves overall performance by improved mixing and combustion, by reduced pressure losses, and by increased mass flows.

Figure 1:
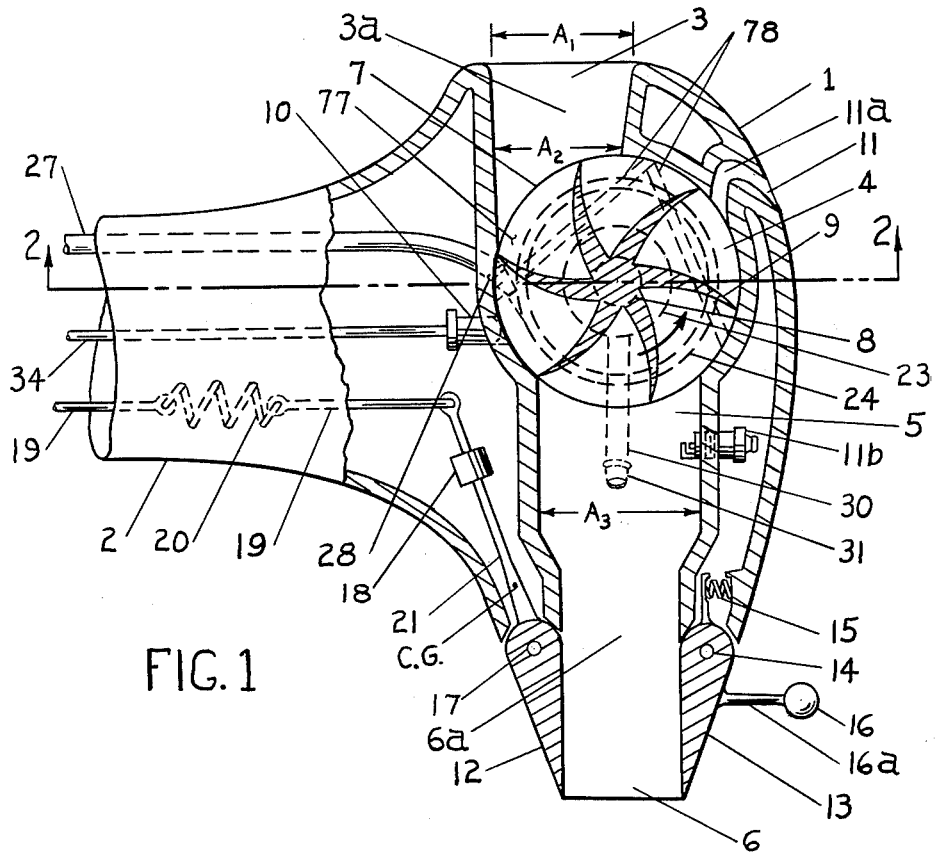
Fig. 1 is a cross-section plan view of the jet engine as mounted at the tip of a helicopter lifting rotor blade.

Referring to Fig. 1, engine housing 1 is shown integral with lifting rotor blade 2. The assembly is shown as a casting for simplicity. The engine has a duct system comprising intake port 3, diffuser or nozzle duct 3a, engine rotor chamber 4, combustion chamber 5, exhaust duct 6a, and exhaust port 6. The longitudinal center line of combustion chamber 5 may or may not be disposed colinear with respect to the center line of rotor chamber 4, as desired. Engine rotor 7 is provided with a core 8 extending transverse to the direction of fluid flow through rotor chamber 4. A plurality of longitudinally extending vanes 9 extend radially from core 8 thereby defining a plurality of compartments to accommodate under rotating conditions fluid flow through rotor chamber 4. Vanes 9 are curved as shown in Fig. 1 in order to more efficiently direct fluid flow into the cavities between vanes 9.

Whereas the term rotor has been elected to describe element 7, said element could also be called a valve under certain operating conditions or an impeller under other operating conditions. If rotor 7 revolves slowly and restricts flow it functions as a valve. If rotor 7 revolves fast under a power drive it functions as an impeller to induce or impel greater airflow through the internal duct system. However, this impeller action at high rotor speeds occurs only under conditions of combustion in the combustion chamber which allows hot, low-density residual exhaust gases to revolve into position at inlet duct 3a. As these gases are quenched to a small fraction of their initial volume by the relatively cold inlet air, a partial vacuum is created in the cavity between vanes 7 which induces greater flow into the engine inlet port. Without combustion occurring, rotor 7 acts not as an impeller, but as a valve. With combustion occurring and at rotative speeds greater than flight speeds, rotor 7 acts as an impeller.

Figure 3:
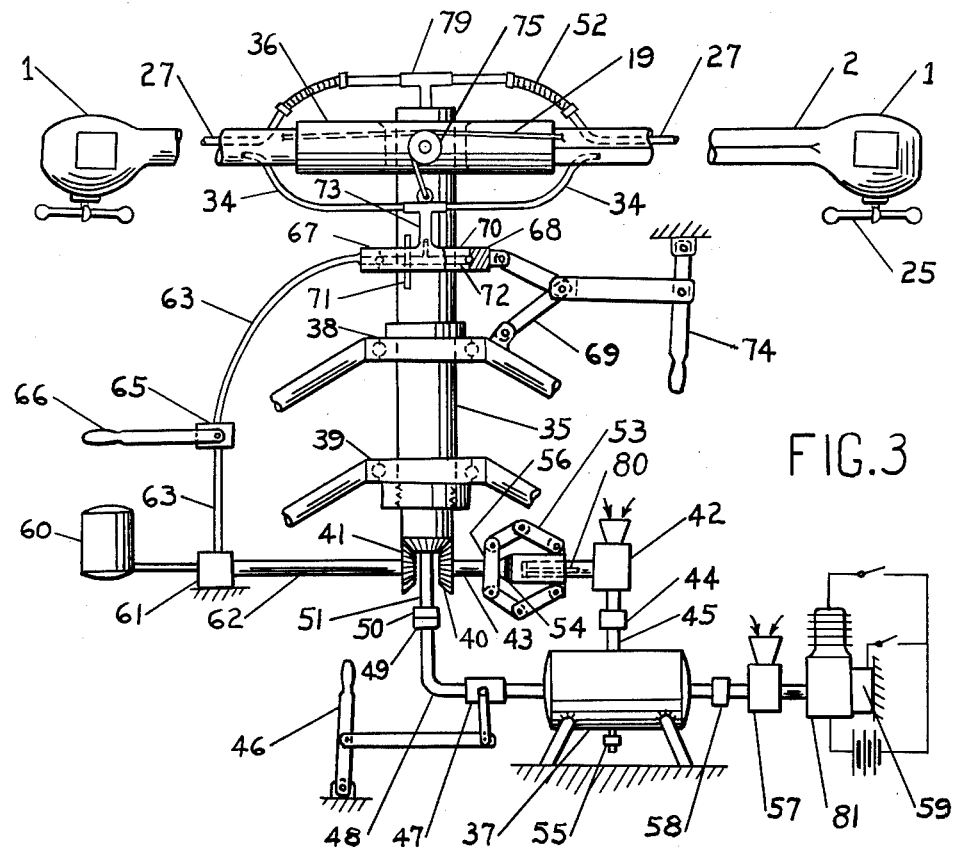
Fig. 3 is a side view of a helicopter lifting rotor shaft, hub, fragmentary lifting blades, compressed air system for driving the engine air turbine, and controls.

In the present description, engine rotor 7 is to be distinguished from the helicopter lifting rotor which comprises the blades 2 and shaft 35 of Fig. 3.

Fuel injection nozzle 10 injects fuel into rotor chamber 4 at a position upstream of combustion chamber 5 to provide time for atomization, but downstream of intake duct 3a so that a rotor vane always separates nozzle 10 from intake duct 3a thereby preventing upstream travel of the fuel vapor and of the flame front. Spark plug 11b ignites the fuel air mixture. The expanding gases flow out of the engine through exhaust port 6. The combustion pressures, if operation is on an explosion cycle, are exerted on rotor 7 and are experienced as propulsive forces on core member 8 and engine housing 1.

A small mass portion of the exhaust products is trapped between successive vanes of rotor 7 because of rotation. These gases are partially exhausted centrifugally through auxiliary exhaust duct 11a and exhaust port 11 which is provided with a bend that causes a reversed flow direction rearwardly to absorb thrust from the change in momentum of the auxiliary exhaust products.

Features to provide improved performance include flaps 12 and 13 which function to regulate the cross-sectional exit area of exhaust port 6. A small exhaust port area provides greater thrust at lower efficiency. A large exhaust port area provides less thrust at greater efficiency. In accelerating the helicopter lifting rotor up to speed a small exhaust area is desirable. At higher lifting rotor speeds a larger exhaust port area is desirable in order to conserve fuel. Flap 12 operates automatically in a manner to compensate for changes in air speed due to changes in lifting rotor rotational speed. Flap 12 rotates about hinge axis 17. A weight 18 is mounted on the end of arm 21 so that the center of gravity, e.g. in Fig. 1, of the system is forward of hinge axis 17. Under low rotative speeds the exhaust port area is small and the thrust is high resulting in faster angular acceleration of the lifting rotor. Flap 12 works against the resistance of spring 20 in retention cable 19, so that the position of flap 12 can be predetermined and calibrated for any given lifting rotor speed. Cable 19 extends to the pilot's controls as described subsequently so that the cross-sectional area of the exhaust port can be controlled by the pilot.

Flap 13, which is supported by hinge 14, operates in a different manner and automatically changes the cross-sectional exit area of exhaust port 6 as a function of airspeed. As a helicopter flies forwardly, the velocity of flight adds to the blade tip speed on the advancing side and subtracts from the blade tip speed on the retreating side as the blade revolves about its hub. As a result, blade drag forces fluctuate cyclically, being high on the advancing side and low on the retreating side. The thrust of the jet engine at the tip of the blade should therefore also vary cyclically in the same manner to provide equilibrium between power required and power supplied. Referring to Fig. 1, as helicopter blade 2 advances into the wind in forward helicopter flight, sphere 16 which is attached by arm 16a to flap 13 protrudes into ambient air and experiences increased aerodynamic drag. Spring 15 tends to hold flap 13 in a neutral position corresponding to the aerodynamic drag of normal blade rotation without forward helicopter flight. Thus as blade 2 advances into the wind, sphere 16 causes the exit area of port 6 to become decreased and engine thrust to be increased as desired. And as blade 2 retreats, the aerodynamic drag on sphere 16 decreases and the exit area of port 6 increases resulting in less thrust to correspond to the decreased drag of the retreating blade. Developed thrust varies cyclically and is coordinated with the cyclically varying required thrust. Such coordination reduces blade vibration and fatigue stresses and reduces fuel consumption.

Figure 2:
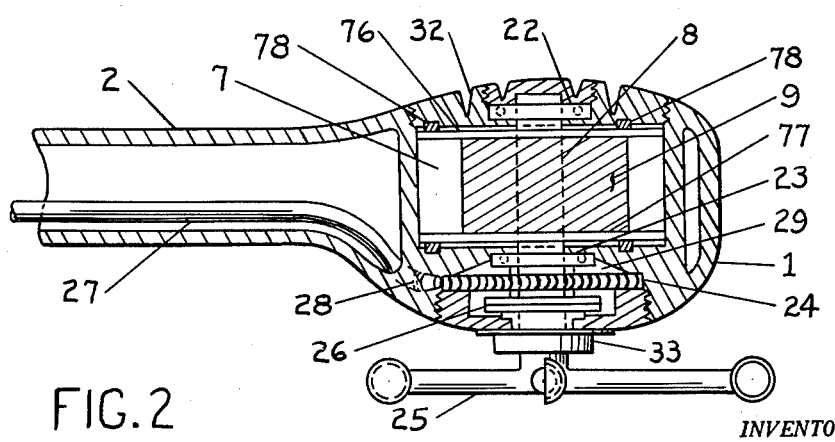
Fig. 2 is a section along line 2—2 of Fig. 1 showing a vaned engine rotor, an air turbine, and other detail parts of the engine.

Rotor 7 is held rotatively by bearings 22 and 23 as shown in Fig. 2. Core portion 8 of rotor 7 extends and associates with compressed air turbine 24 and through free wheeling clutch 26 connects with external ambient air turbine 25. The main driving power for rotor 7 is supplied by turbine 24. Supplementary power to improve performance and also emergency power is supplied by external turbine 25. The power developed by the external turbine is taken from the airstream and adds to the power developed by air turbine 24. This results in greater speeds of rotor 7 and hence greater mass flow and thrust. Also external turbine 25 is a safety feature in that if the compressed air supply for turbine 24 fails, then external turbine 25 alone drives rotor 7 at a reduced rotative speed but at sufficient rotative speed to permit enough thrust development by the engine to effect a prolonged emergency landing of the aircraft or sustained flight at reduced speed.

The gear ratio in gear box 33 of Fig. 2 can be two to one, by way of example, so that for every one revolution of external turbine 25 there are two revolutions of rotor 7. Assume the compressed air system is shut off and that the inlet nozzle or diffuser provides the same dynamic pressures at rotor 7 as the dynamic pressures at external turbine 25. Under these conditions rotor 7 and turbine 25 tend to revolve at the same speeds. However, because of the gear arrangement, turbine 25 is forced to drive rotor 7 at increased rotor speed and to slow down itself and absorb greater impact forces from the airstream. Equilibrium will be reached when rotor 7 operates relatively fast and when turbine 25 operates relatively slow at half of the speed of rotor 7.

When rotor 7 rotates at high speeds under high power output from turbine 24, free wheeling clutch 26 disengages external turbine 25 so that it floats in the airstream without placing a drag torque on core portion 8. Clutch 26 provides a one direction drive so that turbine 25 can drive but not be driven by other mechanical components.

Air turbine 24, which is keyed to shaft 8, drives rotor 7 at a speed greater than the speed of the intake air so that there is increased mass flow of the intake air in accordance with principles discussed previously. Air turbine 24 is driven by compressed air from air line 27. The compressed air is ejected from nozzle 28 and impinges upon the vanes of air turbine 24 causing rotation thereof. This air expands and flows into cavity 29. The expanding air has a refrigerating effect and serves to cool bearing 23. The air then flows through air line 30 to nozzle 31. Nozzle 31 associates with combustion chamber 5 and the exhaust air from air turbine 24 is ejected into the fluid flow through the combustion chamber thereby augmenting the normal fluid mass flow and increasing the thrust and efficiency of the engine. Upper bearing 22 is cooled by exterior air flow over fins 32 in the housing. The heat from the bearings is conducted by metal to the cooling fins.

Losses of pressure of combustion gases in combustion chamber 5 during operation on explosion cycles are minimized by rotor end plates 76 and 77. These plates are secured to the ends of vanes 9 to prevent fluid leakage around the ends of the vanes and to stabilize the vanes structurally. Graphite gaskets 78 are imbedded in slots in the engine housing to seal the air spaces between housing 1 and end plates 76 and 77 of rotor 7. Thus combustion products are prevented from flowing upstream around the ends of rotor 7, and combustion pressures are more fully utilized.

Figure 4:
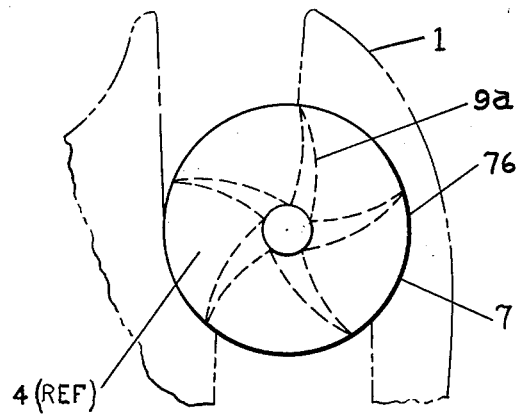
Fig. 4 is an end view of a reversed engine vaned rotor with a partial outline of the engine shown in reference lines.

The rotor vanes 9a as shown in Fig. 4 show an alternate installation wherein the rotor or impeller is reversed in position and the vanes are curved in an opposite direction to that shown in Fig. 1. When the rotative speed of rotor 7 is greater than the speed of the inlet air, vanes 9a function to more efficiently pass the air flowing through rotor chamber 4.

Referring to Fig. 3, helicopter lifting rotor shaft 35 and teetering rotor hub 36 are shown together with other elements used in the operation of engines 1 at the ends of lifting rotor blades 2. Compressed air storage tank 37 retains air under pressure to drive air turbine 24 in engines 1. As lifting rotor shaft 35 rotates in bearings 38 and 39 bevel gear 40 drives air pump 42 through shaft 43. The compressed air flows through pipe 45 and check valve 44 to tank 37. The pilot controls the flow of compressed air to engines 1 by lever 46 which operates air valve 47 in air line 48. Joint 49 of air line 48 is non-rotative whereas joint 50 is rotative with lifting rotor shaft 35. Appropriate glands prevent air leakage at this joint in accordance with conventional practices. Air line 51 extends upward from joint 50 to a T end 79 which engages compressed air lines 27. Flexible lines 52 accommodate the teetering motion of the lifting rotor.

A feature of the compressed air system is the disengagement of air pump 42 from lifting rotor shaft 35 at low rotor speeds where developed power is small and where power requirements are proportionately high because the rotor is undergoing angular acceleration. Thus the resistance torque of the rotor system is reduced to a minimum and the power developed by the engines is used to more rapidly accelerate the rotor up to speed. As shown in Fig. 3, the disengagement is accomplished by centrifugal friction clutch 56. Weights 53 draw friction plates 54 together with a force dependent upon rotor speed. Splines 80 permit the axial motion of the clutch plates at normal rotor speeds, and the rotor therefore drives air pump 42, but not at lower speeds. Pressure relief valve 55 prevents excessive pressures in tank 37.

A complementary compressor system to increase the capacity of the system includes small gas turbine or a one cylinder gasoline engine 81 which drives air pump 57. Check valve 58 prevents reverse flow from tank 37. The electrical system for engine 56 includes a storage battery and electric starter 59.

The electrical system for spark plugs 11b in engines 1 of Fig. 1 include a storage battery or generator and rotor shaft slip rings in accordance with general practice and are not shown.

The fuel system includes fuel tank 60 and fuel pump 61 which is driven from lifting rotor shaft 35 through bevel gear 41 and shaft 62. Fuel valve 65 is regulated by control lever 66 to control the amount of fuel flow to nozzles 10 of Fig. 1. Fuel line 63 extends to fuel distributor plate 67. Outer ring 68 of plate 67 is held non-rotatable by shear link scissors 69. Inner ring 70 of plate 67 rotates with lifting rotor shaft 35 because of key 71 which permits axial motion of plate 67. An annular groove 72 within plate 67 permits fuel flow from fuel line 63 through to fuel lines 34 via T pipe 73 which rotates with ring 70.

Plate 67 slides axially on lifting rotor shaft 35 and its vertical position is determined by scissors 69 which is actuated by control lever 74. T pipe 73 is mounted on plate 67 and moves up and down with motions of lever 74. Cable 19 to engine exhaust port flap 12 of Fig. 1 extends inwardly through the lifting rotor blade and over pulley 75 to an eyelet on T pipe 73. Thus the pilot has control of the exhaust port area of engines 1 by means of lever 74.

The offset relation of inlet port 3a with respect to rotor chamber 4 is a feature of the invention. A significant advance of the prior art is a pulse jet type engine in which the conventional flapper grid valves have been replaced by a rotatably mounted butterfly valve driven by an electric motor. The prior valve was made of a single disc and installed in a straight section of inlet pipe. The valve was rotated at a speed in phase with the resonant tail frequency of the engine. However, said butterfly valve engine is encumbered with a number of important deficiencies that have been eliminated by the present feature of an offset inlet port. These prior deficiencies include, first, momentum pressure losses due to rapid deceleration of fluid flow to zero velocity when the valve is closed, second, momentum pressure losses due to abrupt turbulent fluid flow in 90 degree turns as occur in normal axial duct relations assuming a rotor chamber having arc wall segments as is essential for good pressure seals, third, high throttling pressure losses across the butterfly valve in its partially opened positions, fourth, high aerodynamic drag and loss of net thrust as the butterfly valve is closed or nearly closed causing spillage of inlet air, fifth, high aerodynamic drag as the butterfly valve operates in flat plate stall at high angles of attack over large portions of its cycle, sixth, added valve torque power required to accelerate a portion of the inlet fluid mass in a circular path about the valve axis, seventh, in ability of the valve to be driven at high rotative speeds by ram air for either normal or emergency operation, eighth, ineffectiveness of the butterfly valve in a duct as a flameholder, and ninth, inability to provide increased mass flow through the engine and hence increased maximum thrust or improved fuel economy when the rotor is driven faster by an outside power source than the normal rate of ram air flow through the engine. Revolving the butterfly valve of the prior art at excess speed results merely in churning and added pressure loss of the inlet air. Revolving the present tangentially positioned valve at excess speed results in increased mass flow and hence increased maximum thrust or increased fuel economy for any given thrust. This increased flow results from localized low pressures occurring on the trailing surface of the revolving blade as it moves away from the inlet port at high speed while the residual trapped exhaust gases are quenched to a fraction of their initial volume.

For optimum engine performance the rotor chamber at sections perpendicular to the transverse axis of rotation should be arced to conform to the rotationally generated periphery of the rotor as shown in Fig. 1. This provides advantages such as an improved fluid seal, an effective flame holder, and less throttling pressure losses. However, the arc portions of the conforming chamber contour can be approximated by a series of chords or sections of cycloids or parabolas, etc., allowing some fluid leakage and loss of efficiency and yet reside within the scope of the invention. In general, the term chamber connotes arced walls suitable for the purpose intended.

While I have shown only one embodiment of my invention it is to be understood that said embodiment is for illustrative purposes only and what is intended to be encompassed by Letters Patent is defined by the appended claims.

What is claimed is:

1. For an aircraft, a lifting rotor and a lifting rotor drive system, said lifting rotor comprising a rotatable hub and at least one thrust producing blade attached thereto, and said lifting rotor drive system including a reaction propulsion unit and means for attaching said propulsion unit outwardly to said blade, and said reaction propulsion unit having a duct system including an inlet port, a rotor chamber, a combustion chamber, and an exhaust port, and a vaned rotor rotatably disposed in said rotor chamber about an axis of rotation, and power means to provide for rotation of said rotor, and said power means including a fluid turbine rotatably connected with said vaned rotor, a fluid pump, a conduit to associate said pump with said turbine, and means to interconnect said pump operably with said rotatable hub for operation therefrom.

2. For an aircraft, a lifting rotor and a lifting rotor drive system as in claim 1, and automatic means to disengage said pump from said hub at low hub rotative speeds.

3. For an aircraft, a lifting rotor and a lifting rotor drive system, said lifting rotor comprising a rotatable hub and at least one thrust producing blade attached thereto, and said lifting rotor drive system including a reaction propulsion unit and means for attaching said propulsion unit outwardly to said blade, and said reaction propulsion unit having a duct system including an inlet port, a rotor chamber, a combustion chamber, and an exhaust port, and a vaned rotor rotatably disposed in said rotor chamber about an axis of rotation, and power means to provide for rotation of said rotor, and said power means including a fluid turbine rotatably connected with said vaned rotor, a fluid pump, a conduit to associate said pump with said turbine, and an auxiliary power unit, and means for associating said auxiliary power unit with said pump to provide for operation thereof.

4. For an aircraft, a lifting rotor comprising a hub and at least one thrust producing blade attached thereto, a reaction propulsion unit having a duct system including an inlet port, a rotor chamber, a combustion chamber, and an exhaust port, and a vaned rotor rotatably disposed in said rotor chamber about an axis of rotation, and means for attaching said propulsion unit outwardly to said blade, and said exhaust port including a moveable element arranged to vary the discharge area of said exhaust port, and said moveable element pivotably supported with respect to said propulsion unit, and the center of gravity of said moveable element disposed so as to operably vary said discharge area as a function of centrifugal force on said moveable element resulting from rotation of said blade and propulsion unit assembly about said hub.

5. For an aircraft, a lifting rotor and a lifting rotor drive system, said lifting rotor comprising a rotatable hub and at least one thrust producing blade attached thereto, and said lifting rotor drive system including a reaction propulsion unit having a duct system including an inlet port, a rotor chamber, a combustion chamber, and an exhaust port, and a vaned rotor rotatably disposed in said rotor chamber about an axis of rotation transverse to the direction of fluid flow through said rotor chamber, and said inlet port asymmetrically disposed with respect to said rotor chamber to provide a substantially tangential duct relation between said inlet port and said rotor chamber, and means for attaching said propulsive unit outwardly to said blade with said axis of rotation of said vaned rotor substantially normal to the chord plane of said blade.

(References on following page)

References Cited in the file of this patent

UNITED STATES PATENTS

| | | | |
|---|---|---|---|
| 1,369,672 | Koenig | Feb. 22, | 1921 |
| 1,886,513 | Anderson | Nov. 8, | 1932 |
| 1,980,266 | Goddard | Nov. 13, | 1934 |
| 2,361,939 | Gruss | Nov. 7, | 1944 |
| 2,433,107 | Forsyth | Dec. 23, | 1947 |
| 2,462,587 | Wilcox | Feb. 22, | 1949 |
| 2,480,626 | Bodine | Aug. 30, | 1949 |
| 2,485,502 | McCollum | Oct. 18, | 1949 |
| 2,507,481 | Moosbrugger | May 9, | 1950 |
| 2,508,396 | Jordan | May 23, | 1950 |
| 2,514,749 | Dobbins | July 11, | 1950 |
| 2,601,463 | Stanley | June 24, | 1952 |
| 2,645,412 | Sens | July 14, | 1953 |
| 2,667,226 | Doblhoff | Jan. 26, | 1954 |
| 2,693,675 | Schaffer | Nov. 9, | 1954 |
| 2,779,530 | Jendrassik | Jan. 29, | 1957 |

FOREIGN PATENTS

| | | | |
|---|---|---|---|
| 486,296 | Canada | Sept. 9, | 1952 |
| 554,425 | Great Britain | July 2, | 1943 |
| 1,038,864 | France | May 13, | 1953 |